(12) United States Patent
Brewer

(10) Patent No.: US 10,010,219 B1
(45) Date of Patent: Jul. 3, 2018

(54) ADJUSTABLE KAMODO-STYLE SMOKER DAMPER TOP WITH ADAPTER FOR DECORATIVE ATTACHMENTS

(71) Applicant: Cassady Vaughn Brewer, Atlanta, GA (US)

(72) Inventor: Cassady Vaughn Brewer, Atlanta, GA (US)

( * ) Notice: Subject to any disclaimer, the term of this patent is extended or adjusted under 35 U.S.C. 154(b) by 11 days.

(21) Appl. No.: 15/610,944

(22) Filed: Jun. 1, 2017

(51) Int. Cl.
 *A47J 37/07* (2006.01)
 *F24C 15/20* (2006.01)
 *F24F 13/12* (2006.01)

(52) U.S. Cl.
 CPC ....... *A47J 37/0786* (2013.01); *F24C 15/2021* (2013.01)

(58) Field of Classification Search
 CPC ........ A47G 19/24; F24F 1/0011; F24F 13/10; F24F 13/12
 USPC .......................................... 454/3; 220/203.5
 See application file for complete search history.

(56) References Cited

U.S. PATENT DOCUMENTS

| | | | | |
|---|---|---|---|---|
| 38,370 | A * | 5/1863 | Boynton | F23J 13/00 126/312 |
| 2,855,712 | A * | 10/1958 | Diletto | F23L 17/02 220/327 |
| 8,596,243 | B2 * | 12/2013 | Perr | F01N 3/031 123/337 |
| 9,615,693 | B1 * | 4/2017 | Merritt | A47J 37/0786 |

* cited by examiner

*Primary Examiner* — Jorge Pereiro
(74) *Attorney, Agent, or Firm* — Morris, Manning & Martin, LLP; John R. Harris

(57) ABSTRACT

An adjustable vent topper for the chimney of a kamado-style cooking smoker or oven. The vent topper allows for more precise control of temperature and smoke within the oven, and also allows for a decorative and entertaining display of smoke from a decorative article. The vent topper comprises a generally frustoconical body having alignable openings along the side of the frustocone for controlling the flow of air and smoke from within the oven. The vent topper further includes an opening in a chimney on the top surface of the frustoconical body for receiving a decorative article. The decorative article may be a nonventing plug or may be a decorative smoke-emitting article such as a smokestack, whistle, vehicle exhaust, gun, cannon, or other smoke-emitting object.

29 Claims, 14 Drawing Sheets

ADJUSTABLE KAMODO-STYLE SMOKER DAMPER TOP WITH ADAPTER FOR DECORATIVE ATTACHMENTS

TECHNICAL FIELD

The present disclosure relates generally to kamado-style cooking ovens or smokers, and more particularly relates to vents for such ovens or smokers that allow temperature and smoke control, as well as decorative and entertaining smoke displays.

BACKGROUND

Kamado-style ceramic charcoal cooking ovens or smokers are popular for cooking and grilling. Such cooking smokers act as an oven with high heat for baking and roasting, and also provide direct and/or indirect heat and smoke for grilling and smoking of meats. Popular kamado-style cooking smokers are sold under brand names such as BIG GREEN EGG®, KAMADO JOE®, and PRIMO®. Examples of such kamado-style cooking smokers are found in U.S. Pat. Nos. 6,463,923, 9,237,828, and 9,532,680.

Kamado-style smokers burn charcoal, lump or briquette, and generate smoke that impart a smoky flavor to foods cooked in the device. Often, a person using such a smoker will employ damp chips of various types wood, e.g. hickory, mesquite, apple, pecan, etc. to generate more smoke and provide a distinctive flavor in the cooked food. Extra smoke is often considered desirable for such cookers.

Typically, the smokers have a round or oval top, with a built-in exhaust chimney on the top for exhausting smoke. The temperature of the oven is controlled by adjusting an air intake vent, usually at the bottom of the oven, and also by adjusting an exhaust vent or damper, which sits atop the chimney. In some cases, the damper is a simple rotatable chimney cover with holes that may be closed, partially opened, or opened fully to adjust the flow of smoke from the kamodo-style smoker. The damper is sometimes called a "Topper", as it sits atop the kamado-style smoker's exhaust chimney. One example of such a damper top is shown as element 40 in U.S. Pat. No. 9,532,680.

More commonly, though, "Toppers" are relatively complex venting devices, typically round, constructed of cast iron and having three-major functioning parts: (i) a base that fits snugly on the built-in chimney of the kamado-style smoker and that has a large vent hole ("Topper Base"); (ii) a second piece that attaches to the damper base with a small screw, that can move laterally across the top of the damper base to cover or partially expose the large vent hole in the damper base, and that itself has oval vent holes for emitting smoke ("Topper Base Cover"); and (iii) a third piece ("Topper Damper") that corresponds with and fits over the Topper Base Cover, that attaches to the center of the Topper Base Cover with a screw, that has oval vent holes matching those of the Topper Base Cover, and that can be rotated over the Topper Base Cover to adjust the flow of smoke by exposing, partially-exposing, or closing the oval holes in the Topper Base Cover.

Rotating the Topper Damper to align with the openings in the Topper Base Cover allows greater air flow and raises the temperature within the kamodo-style smoker, while overlapping the openings partially impedes air flow and lowers the temperature in the smoker. The quantity of smoke and smoky flavor can also be adjusted with the combination of air intake control and Topper Damper control. The entire Topper usually is sold fully assembled to be placed on top of the kamado-style smoker's chimney. One example of such a Topper is shown as element 172 in U.S. Pat. No. 9,237,828.

A person using kamado-style ovens usually enjoys producing the smoke, as do his or her guests, as smoky aromatic cooked meats are popular in many households. The volume and type of smoke, combined with the smell of cooking food, is a part of the ambience of wood smoker cooking. Some persons using these smokers would enjoy further highlighting the smoke for himself or herself, or for his or her guests, by using the smoke to create an entertaining display to accompany the cooking event. None of the common types of Toppers provide any type of entertaining display of smoke or the ability to attach other pieces to the Topper to create an entertaining display of smoke.

INTRODUCTION AND PRESENT DISCLOSURE OVERVIEW

Briefly described, the present disclosure relates to a four-piece device that would substitute for the typical Topper Base Cover (see above definition) and Topper Damper (see above definition) to vent smoke and accommodate decorative attachments, thereby creating an entertaining display of smoke from kamado-style smoker ovens. A cooking oven or smoker suitable for use with the present disclosure has a vertically extending chimney for exhausting heat and smoke from a heat source within the oven, and a "Topper Base" (see above definition) positioned on the chimney of the oven.

More specifically, the disclosed, four piece, adjustable venting device ("Assembled Replacement Damper") is mounted to the Topper Base and controls the control of air flow and smoke from the top of the smoker, and thus assists in controlling temperature within the oven. According to a fully assembled aspect, the Assembled Replacement Damper comprises a generally frustoconical body having alignable openings along the side of the frustocone for controlling the flow of air and smoke from within the oven, and a chimney on the top annular surface of the frustoconical body for emitting smoke and receiving a decorative attachment if desired.

According to another, disassembled aspect, the Assembled Replacement Damper is comprised of four separate parts.

One, a generally frustoconical cover ("Replacement Damper Cover") having a plurality of spaced-apart smoke-venting openings on the surface of the frustocone for allowing smoke and air to vent outwardly from the interior of the frustocone, the Replacement Damper Cover being affixable to a common Topper Base. A square, grooved tab on the lip of the Replacement Damper Cover with a small hole for a screw allows the Replacement Damper Cover to be affixed to a common Topper Base. Further, the top of the Replacement Damper Cover has a small, round chimney protruding from the Replacement Damper Cover with a hole. An entertaining smoke-emitting attachment (but which attachment is not part of the present disclosure) may be inserted into the hole in the chimney of the Replacement Damper Cover. The chimney of the Replacement Damper Cover also contains a receiver tap for a small set screw or thumb screw that may be tightened to secure any attachment within the chimney hole.

Two, a generally frustoconical rotatable cap ("Replacement Damper Cap") enclosing and housing the Replacement Damper Cover, the Replacement Damper Cap having a plurality of spaced-apart smoke-venting openings on the surface of the frustocone matching those of the Replacement Damper Cover. A hole at the top of the Replacement Damper Cap allows the chimney of the Replacement Damper Cover to extend above the top of the Replacement Damper Cap. Further, the Replacement Damper Cap has a triangular-shaped tab extending from one side of the cap that allows the user to rotate the Replacement Damper Cap around the Replacement Damper Cover.

Three, a circular retaining ring ("Replacement Damper O-Ring") that fits over the Replacement Damper Cap and is attached to the Replacement Damper Cover to secure the Replacement Damper Cap over the Replacement Damper Cover. Further, corresponding to the square tab on the lip of the Replacement Damper Cover, the Replacement Damper O-Ring contains a small, square tab on the lip of the Replacement Damper O-Ring with a hole to insert a screw to secure the Replacement Damper O-Ring to the Replacement Damper Cover. Further, the square tab on the lip of the Replacement Damper O-Ring contains rectangular ridges that correspond to the grooves on the Replacement Damper Cover. These matching ridges and grooves further secure the Replacement Damper O-Ring to the Replacement Damper Cover.

Four, a small plug with an egg-shaped handle ("Replacement Damper Plug") that fits into the chimney hole at the top of the Replacement Damper Cover.

Once fully assembled and attached to a common Topper Base to replace the common Topper Cover and Topper Damper, the Assembled Replacement Damper controls the flow of air and smoke from a kamodo-style smoker oven similar to more common Toppers. In particular, by rotating the Replacement Damper Cap to expose, partially expose, or close the holes in the Replacement Damper Cover, the user may regulate the flow of air and smoke from within the oven. Further, by closing the vent holes and inserting the Replacement Damper Plug into the chimney protruding from the Replacement Damper Cover, the user may completely restrict the flow of air and smoke through the Assembled Replacement Damper.

BRIEF SUMMARY

The foregoing "Introduction and Overview of Present Disclosure" provides a general description of the subject of the present disclosure. This "Brief Summary" provides a more technical description of the subject of the present disclosure.

The present disclosure relates to providing an adjustable vent topper for mounting a decorative article for a cooking smoker or oven, such as a kamado-style cooking smoker oven. The vent topper may allow venting of smoke and air for temperature and/or smoke control, as well as provide a smoke-emitting entertainment. Typically, a cooking oven or smoker suitable for use with the disclosed vent topper has a vertically extending chimney for exhausting heat and smoke from a heat source within the oven, and a vent cap base positioned on the chimney of the oven. The disclosed adjustable smoke-venting vent topper is mounted to the vent cap base on the oven, and is used to assist in the control of air flow and smoke, and temperature within the oven.

According to one aspect, the disclosed vent topper comprises a generally frustoconical body having alignable openings along the side of the frustocone for controlling the flow of air and smoke from within the oven, and a chimney on the top annular surface of the frustoconical body with an opening for receiving a decorative article and a receiver for a set screw to secure the article.

According to another aspect, the vent topper comprises a generally frustoconical exhauster base having a plurality of spaced-apart smoke-venting openings on the surface of the frustocone for allowing smoke and air to vent outwardly from the interior of the frustocone, the exhauster base being affixable to the vent cap base and containing a chimney and opening to receive a decorative article. Further according to this aspect, the vent topper further comprises a generally frustoconical rotatable exhauster vent cap enclosing and housing the frustocone of the exhauster base, the exhauster vent cap having a plurality of spaced-apart smoke-venting openings on the surface of the frustocone for allowing smoke and air to vent outwardly from the interior of the exhauster base and the exhauster vent cap. Preferably, the openings of the exhauster base are alignable with the openings of the exhauster vent cap for maximum air flow, with the smoke-venting openings of the exhauster vent cap being movable by rotation along the axis of the frustocone of the exhauster base and the exhauster vent cap such that portions of the openings in the exhauster base may be obscured so as to reduce the surface area of the openings, to allow for selective control of air flow and smoke from within the vent topper.

According to another aspect, the exhauster base includes a lower annular groove and a lower annular lip at the base of the frustocone, and the rotatable exhauster vent cap includes a lower annular lip at the base of the frustocone that fits within the lower annular groove of the exhauster base and is retained by the lower annular lip of the exhauster base but allowing rotational movement.

According to another aspect, the disclosed vent topper further comprises an annular retaining ring positioned over the lower annular lip of the exhauster vent cap to retain the lower annular lip of the rotatable exhauster cap within the annular groove of the exhauster base.

According to another aspect, the frustoconical body of the disclosed vent topper comprises a frustoconical inner exhauster base with a chimney hole at the top of the base and a nested frustoconical outer rotatable outer vent cap, having openings on the surfaces of the frustoconical inner exhauster base and the frustoconical outer rotatable vent cap that can be aligned or obscured to control the flow of air and smoke by rotating the outer rotatable outer vent cap relative to the inner exhauster base.

According to another aspect, the top annular surface of the frustoconical body comprises a smoke-venting opening on the top annular surface of the frustocone of the rotatable exhauster cap, and a corresponding chimney with a smoke-venting opening at the top of the chimney that is part of the annular surface of the frustocone of the exhauster base, aligned with the smoke-venting opening on the top annular surface of the rotatable exhauster cap, for receiving a decorative article.

According to another aspect, exhauster base of the vent topper comprises a fastening tab extending diametrically outwardly from the exhauster base and having a fastener opening therein for receiving a fastener to affix the exhauster base to the vent cap base. Preferably, the fastening tab includes one or more anti-rotation grooves a for receiving one or more anti-rotation ridges on a retaining ring. Further in such an aspect, the retaining ring preferably includes one or more downwardly-extending anti-rotation ridges that fit within the anti-rotation grooves of the fastening tab of the exhauster base.

According to another aspect, the chimney on the top annular surface of the frustocone of the vent topper contains an angled, square tab on the side of the chimney that has female threading threaded for receiving a set screw that can be tightened to secure the decorative article and loosened to remove the decorative article. In one related aspect, the opening at the top of the chimney on annular surface of the frustoconical body may be closed with a nonventing decorative plug secured by the set screw. In another aspect, a smoke-venting decorative article is mounted to the opening in the chimney on the top annular surface of the frustoconical body, to provide an entertaining smoke-emitting display. For example, the smoke-venting decorative article may have the shape of a smoke-emitting object such as, by way of example, a locomotive smokestack, a factory smokestack, a whistle, a vehicle exhaust, a gun, a cannon, or other entertaining smoke-emitting article.

Details of the construction and operation of the disclosed embodiments are more fully hereinafter described and claimed. In the detailed description, reference is made to the accompanying drawings, forming a part of this disclosure, in which like numerals refer to like parts throughout the several views.

BRIEF DESCRIPTION OF THE DRAWINGS

The accompanying drawings illustrate one or more embodiments and/or aspects of the disclosure and, together with the written description, serve to explain the principles of the disclosure.

DETAILED DESCRIPTION

For the purpose of promoting an understanding of the principles of the present disclosure, reference will now be made to the embodiments illustrated in the figures and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Figure 1:
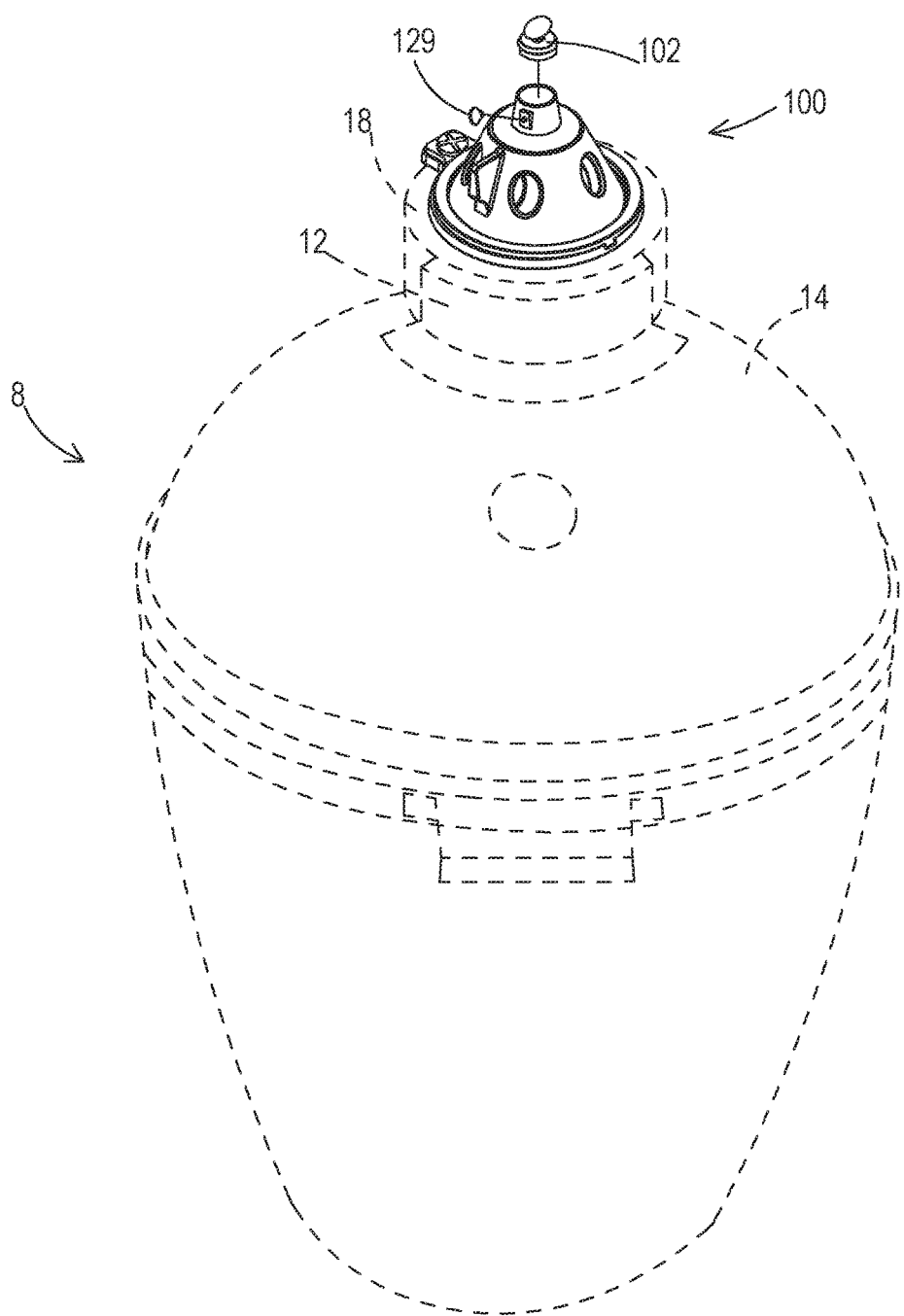
FIG. 1 is a perspective view of a kamado-type cooking smoker with an exemplary vent constructed in accordance with the present disclosure (showing a nonventing plug in the opening).

FIG. 1 is a perspective view of a kamado-style cooking smoker or oven or cooker 8 (in phantom), having a chimney or vent topper assembly 100 constructed in accordance with aspects of this disclosure. The vent topper 100 is shown fastened to vent cap base 18 (in phantom) positioned on top of a tubular chimney or vent 12 (also in phantom) that opens upwardly from a top or dome portion 14 of the oven 8. As will be shown and described the vent topper 100 and associated vent cap base 18 closes the top of the chimney 12 (in phantom) so as to regulate the flow of air through the cooker 8 to control the temperature, and also exhausting of smoke. According to one aspect, the vent topper 100 can have a solid top or plug 102, or can have a decorative smoke-venting item, as will be shown.

Figure 2:
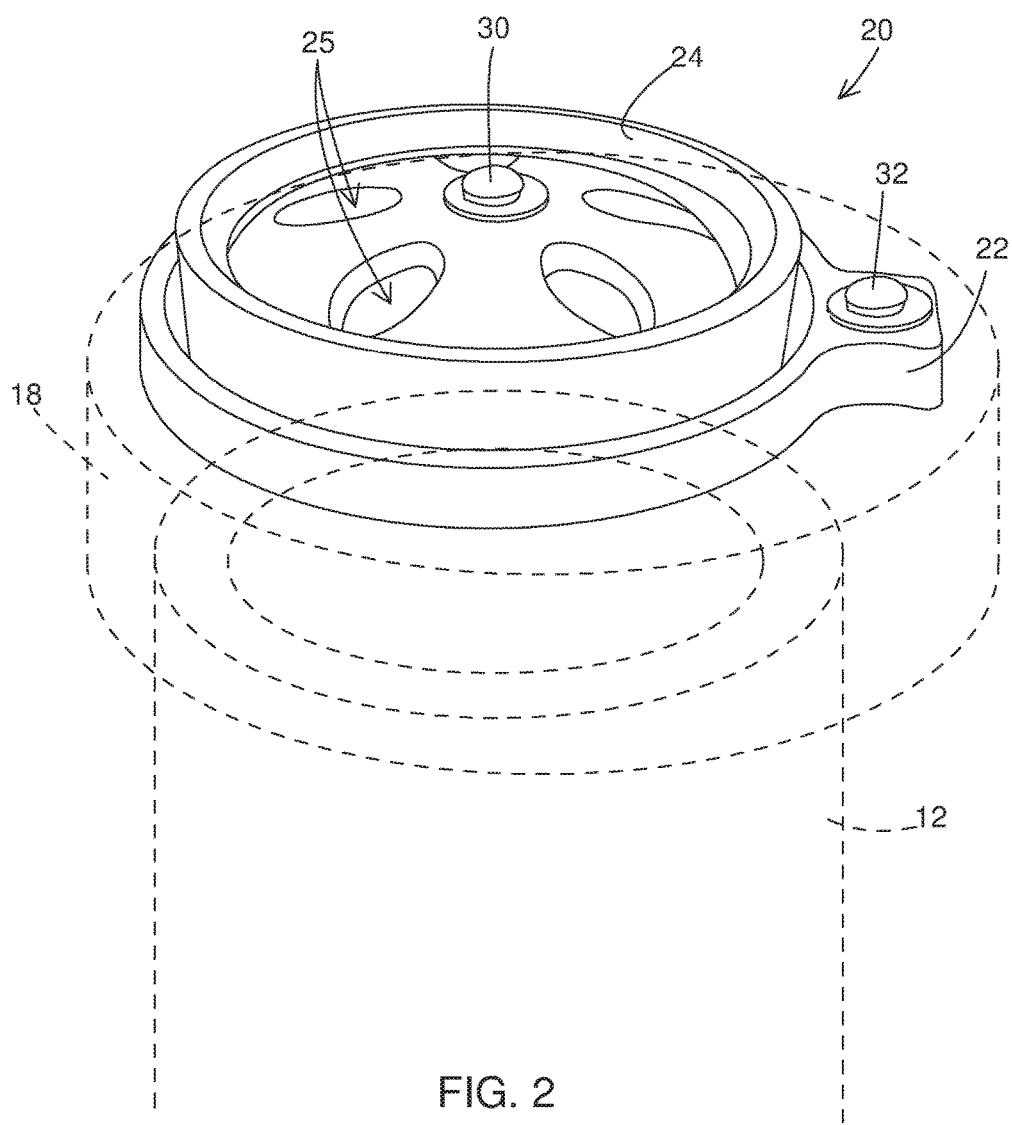
FIG. 2 is perspective view of prior art (conventional) smoker vent.

FIG. 2 shows a conventional (prior art) vent topper 20, commonly found on kamado-style cookers. Such a conventional type of vent topper 20 is somewhat disk-shaped, and typically comprises a slightly circular and domed base portion 22 that is fastened to a vent cap base 18 (in phantom) by a screw 32 and sits atop a chimney 12 (in phantom), and a mating slightly domed rotatable top portion 24 that is fastened by fastener 30 and rotates relative to the base portion 22. The rotatable top portion 24 is rotatably fastened to the base portion 22 with a threaded fastener 30. Both the base portion 22 and top portion 24 include openings e.g. 25 that can be aligned to allow venting of smoke and air, or closed down by overlapping to restrict air flow and smoke. Such a conventional vent topper 20 is typically fastened to a vent cap base 18 (in phantom) with a fastener 32, so that the entire vent topper 20 can be rotated relative to the chimney opening on the oven.

Figure 3:
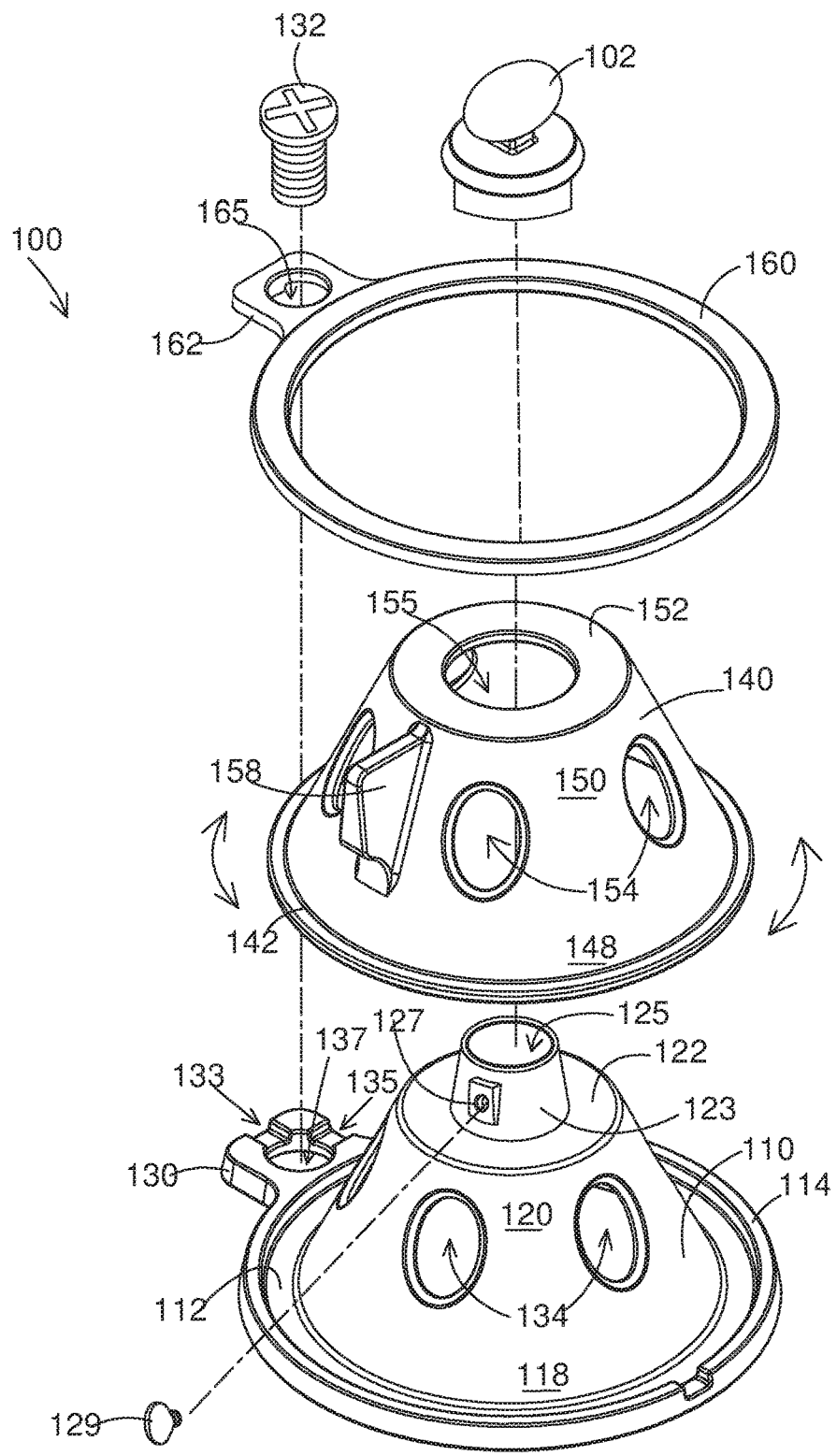
FIG. 3 is a perspective exploded view of decorative smoker vent constructed in accordance with the present disclosure, having a nonventing plug, showing a bottom exhauster base, a rotatable exhauster vent cap, and a retaining ring.

FIG. 3 is an exploded perspective view of a vent topper 100 constructed in accordance with aspects of this disclosure. This particular vent topper 100 allows for a solid plug 102 at the top, or for mounting of a decorative item that exhausts the smoke for an entertaining display, as will be shown.

The vent topper 100 in FIG. 3 comprises an inner exhauster base 110, a rotatable outer exhauster vent cap 140, a retaining ring 160, and, optionally, a solid plug 102 for certain (perhaps less smoke-producing entertainment) applications. The exhauster base 110 has a generally frustoconical shape, having a lower annular grooved region 112, an annular lip 114 positioned outwardly of the grooved region 112, and a lower region 118 of the frustoconical shape that reduces in diameter to a top region 120 of the frustoconical shape. The top surface 122 of the frustoconical shape is also annular and includes an upwardly extending cylindrical exhauster chimney 123 that includes an opening 125 for receiving and retaining a plug 102 or decorative smoke-venting article, as shown in figures below. The opening 125 is adapted to receive and support a decorative article. A protruding tab with a threaded opening 127 in the side of the exhauster chimney 123 receives a thumbscrew 129 that holds an article such as plug 102 or a smoke venting decorative article such as shown in other figures.

The exhauster base 110 further includes a mounting tab 130, generally square, having a pair of orthogonally positioned slots or grooves. The mounting tab 130 extends diametrically from the annular lip 114, and provides an opening 137 for receiving a threaded fastener 132. The threaded fastener 132 is screwed into a vent cap base 18 (not shown in FIG. 3) to retain the entire vent topper 100 assembly in place, but allows pivoting of the entire vent topper assembly 100 relative to the vent cap base.

The mounting tab 130 on the exhauster base 110 includes a diametrically extending anti-rotation groove 133 and a circumferentially extending anti-rotation groove 135, for receiving anti-rotation tabs (not shown) on a retaining ring 160, as shown and described in further detail below.

The exhauster base 110 further comprises a plurality of oval air or smoke venting openings 134, positioned around the frustocone, spaced apart. These openings will align or overlap with similar openings on the rotatable exhauster cap 140, for controlling air flow, temperature, etc.

The rotatable outer exhauster cap 140 also has a generally frustoconical shape, having a lower annular lip 142, and lower region 148 of the frustoconical shape that reduces in diameter to a top region 150 of the frustoconical shape. A top surface 152 of the frustoconical shape is also annular and includes an opening 155 for receiving the exhauster chimney 123 and any associated plug 102 or decorative smoke-venting article, as shown in figures below.

The rotatable exhauster cap 140 also further comprises a plurality of oval air or smoke venting openings 154, positioned around the frustocone, spaced apart. These openings will align or overlap with similar openings 134 on the exhauster base 110, for controlling air flow, temperature, etc.

The rotatable exhauster cap 140 further comprises an adjustment tab or handle 158 that allows a person operating the device to rotate the cap so as to align the openings 134, 154, for maximum venting, or close down the openings relative to each other, to restrict the air flow. The cap 140 preferably rotates in either direction, as indicated by the arrows in FIG. 3.

Figure 12:
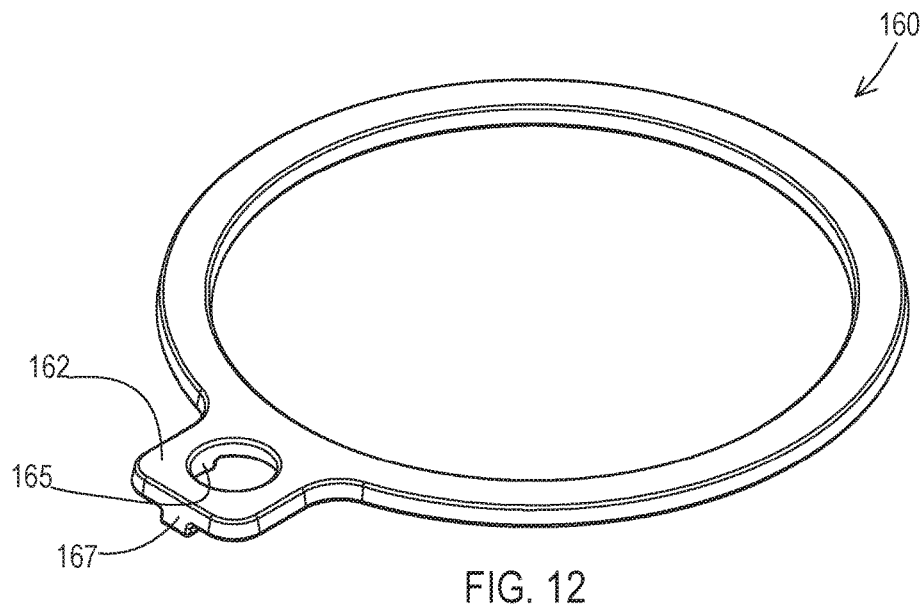
FIG. 12 is a perspective view of a retaining ring constructed in accordance with this disclosure.
Figure 13:
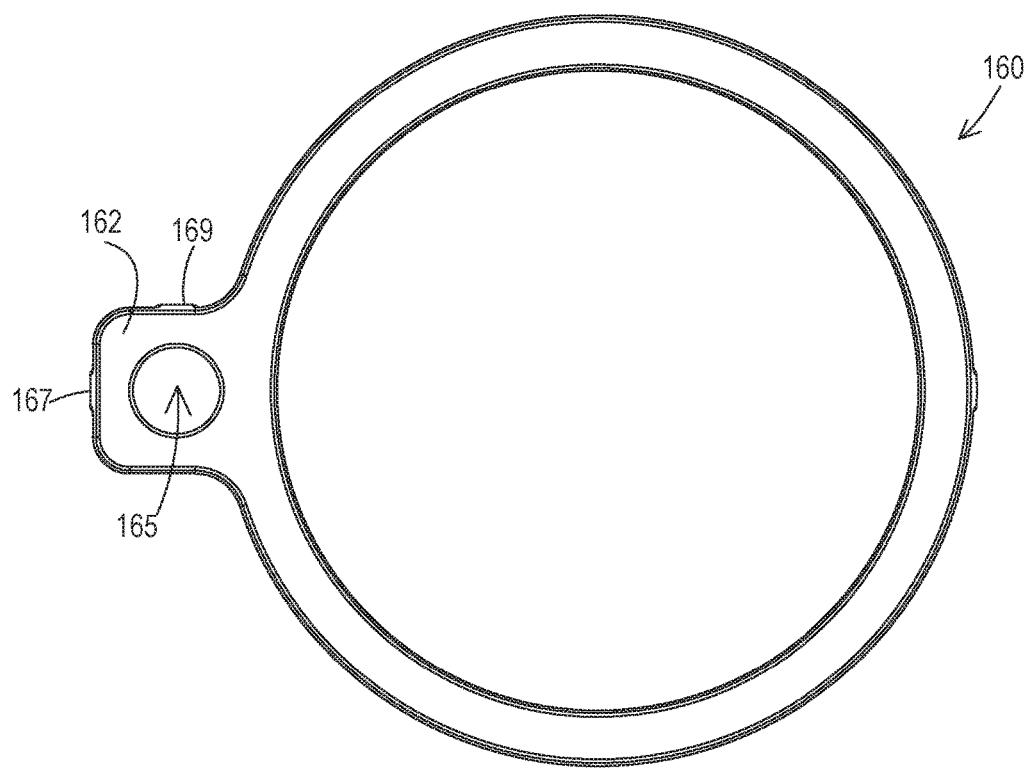
FIG. 13 is a top plan view of the retaining ring.
Figure 14:
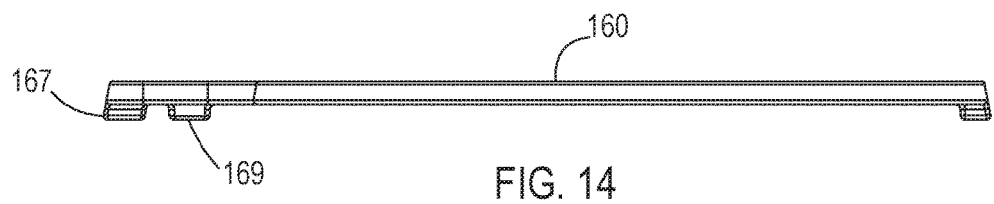
FIG. 14 is side plan view of the retaining ring.

The retaining ring 160 comprises an annular ring, having a tab 162 extending diametrically outwardly of the ring, and includes an opening 165 for receiving the fastener 132. Anti-rotation tabs, not visible in FIG. 3 but see FIGS. 12, 13, 14, are provided on the retaining ring, as described further below.

In the overall assembly of the chimney or vent topper 100, the retaining ring 160 is positioned on top and engaged with the lower annular lip 142 of the rotatable exhauster cap 140, such that the lower annular lip 142 is held in the annular grooved region or retaining groove 112 of the exhauster base 110, but allowed to rotate. The rotatable outer exhauster cap 140 is affixed on top of and encloses the frustoconical portions of the exhauster base 110, rotatable with respect thereto by movement of the adjustment tab or handle 158. The fastener 132 passes through the opening 165 in the retaining ring 160 and into threads of the threaded opening 135 of the tab on the exhauster base 110.

Stated in other words, the frustoconical outer portions of the exhauster base 110 are nested within the frustoconical inner portions of the rotatable exhauster cap 140, and the smoke-venting openings 134, 154 can be made to align for maximum venting of air and smoke, or closed off so as to reduce air flow, temperature, and smoke. If the solid plug 102 is affixed within the opening 125 of the exhauster chimney 123, all smoke and air flow will be controlled by the position of the rotatable exhauster cap 140. However, as will be appreciated from the following, the solid plug or topper 102 can be replaced with a decorative smoke venting article, for entertainment and/or further air flow and smoke control.

Figure 4:
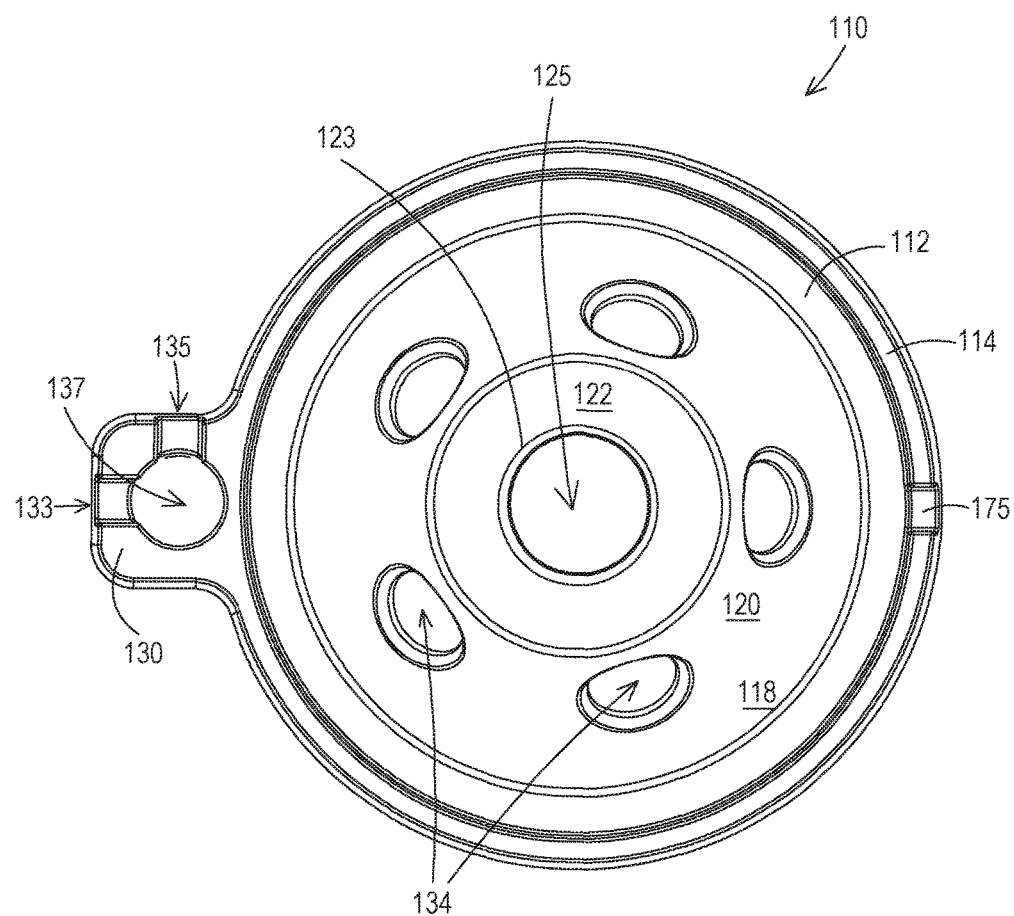
FIG. 4 is top plan view of a bottom exhauster base constructed in accordance with the present disclosure.

FIG. 4 is a top plan view of the exhauster base 110, according to an aspect of this disclosure. Preferably, the exhauster base 110 is made of cast iron or other metal for temperature resistance and durability. The tab 130 on the exhauster base can be seen to include a pair of slots or grooves or recesses 133, 135, positioned orthogonally to each other, one 133 extending diametrically from the threaded opening 137, the other 135 extending circumferentially relative to the cap. These slots are used to retain a downwardly extending anti-rotation tabs provided on the retaining ring 160, as described in greater detail below.

Figure 5:
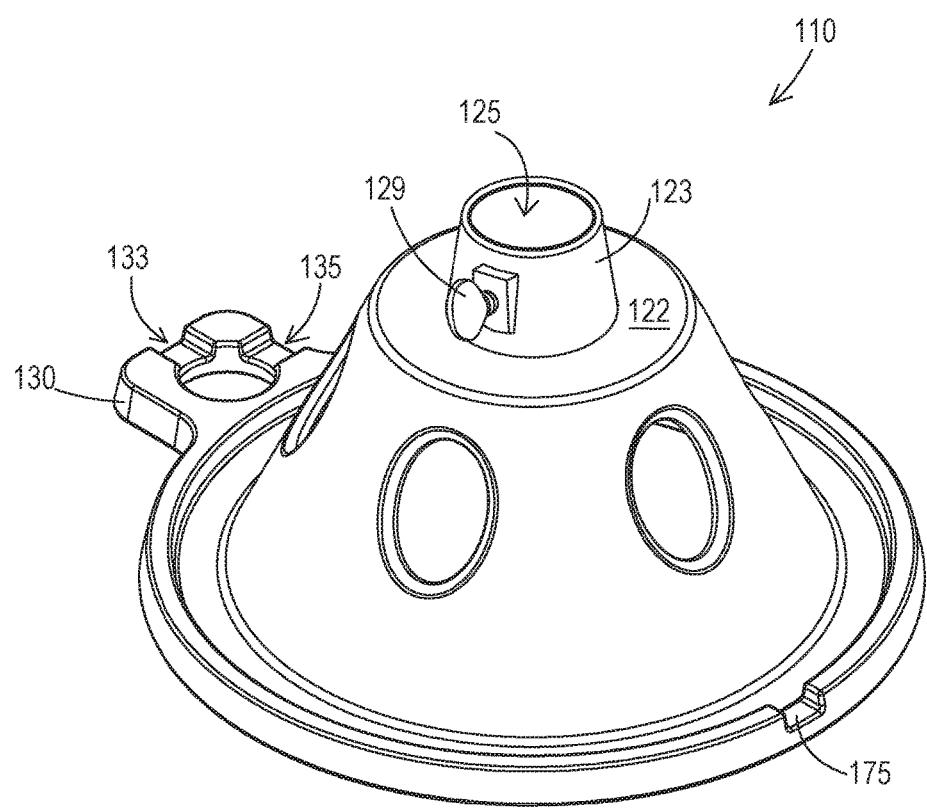
FIG. 5 is a perspective view of the bottom exhauster base.

FIG. 5 is a perspective view of the exhauster base 110.

Figure 6:
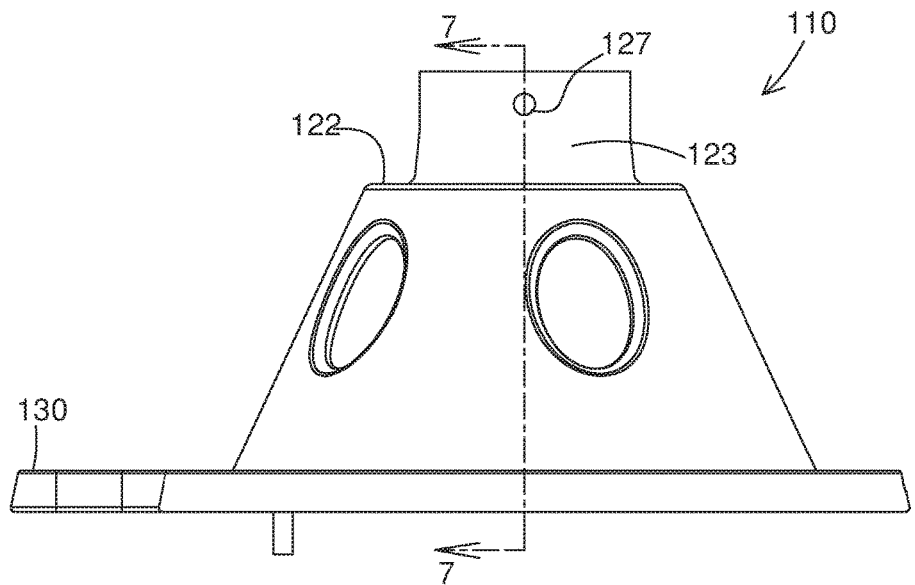
FIG. 6 is a side plan view of the bottom exhauster base.

FIG. 6 is a side plan view of the exhauster base 110.

Figure 7:
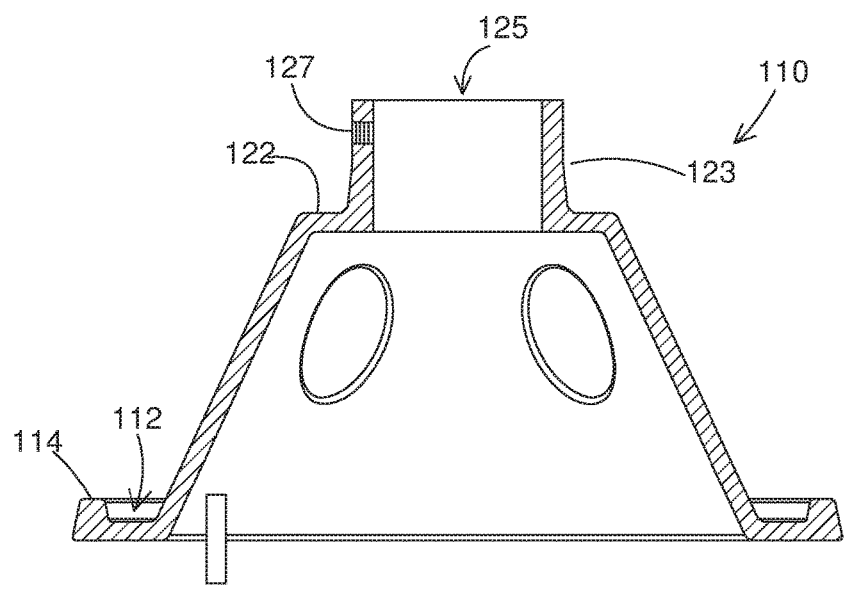
FIG. 7 is a cutaway view of the bottom exhauster base.

FIG. 7 is a cross-sectional view of the exhauster base 110, taken along the line 7-7 of FIG. 6, showing details of the annular ring 114 and retaining groove 112.

Figure 8:
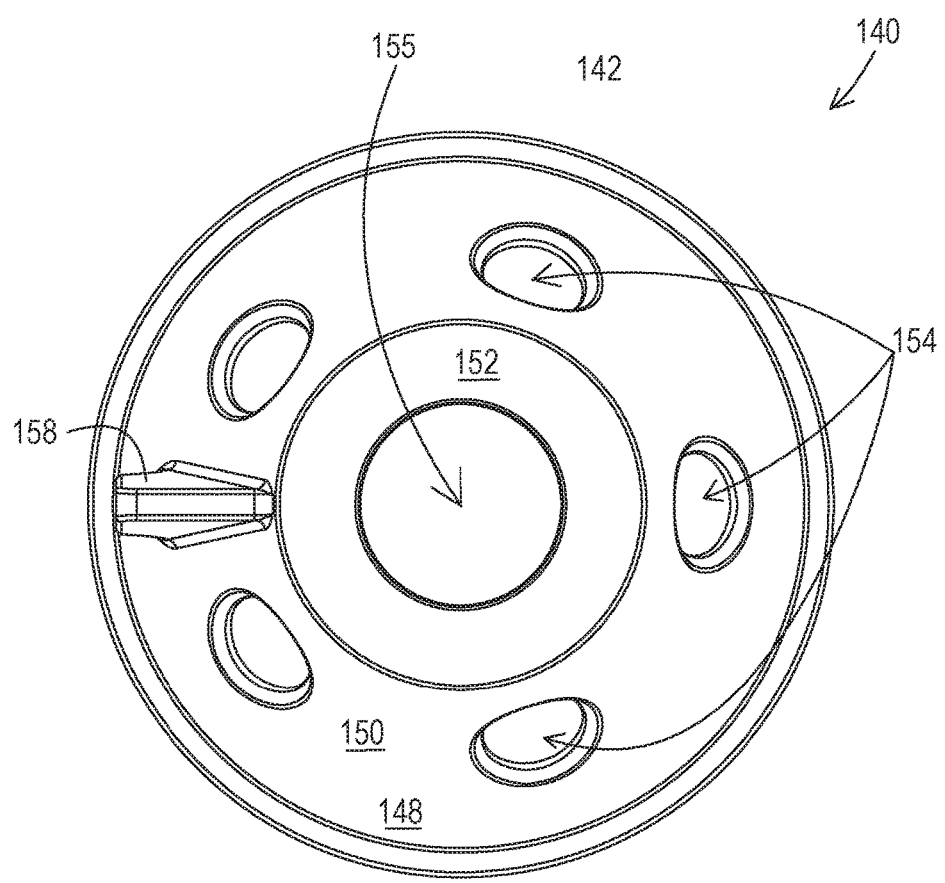
FIG. 8 is a top plan view of a rotatable exhauster vent cap constructed in accordance with the present disclosure.

FIG. 8 is a top plan view of the rotatable exhauster cap 140, according to an aspect of this disclosure. Preferably, the exhauster cap 140 is also made of cast iron or other metal for temperature resistance and durability.

Figure 9:
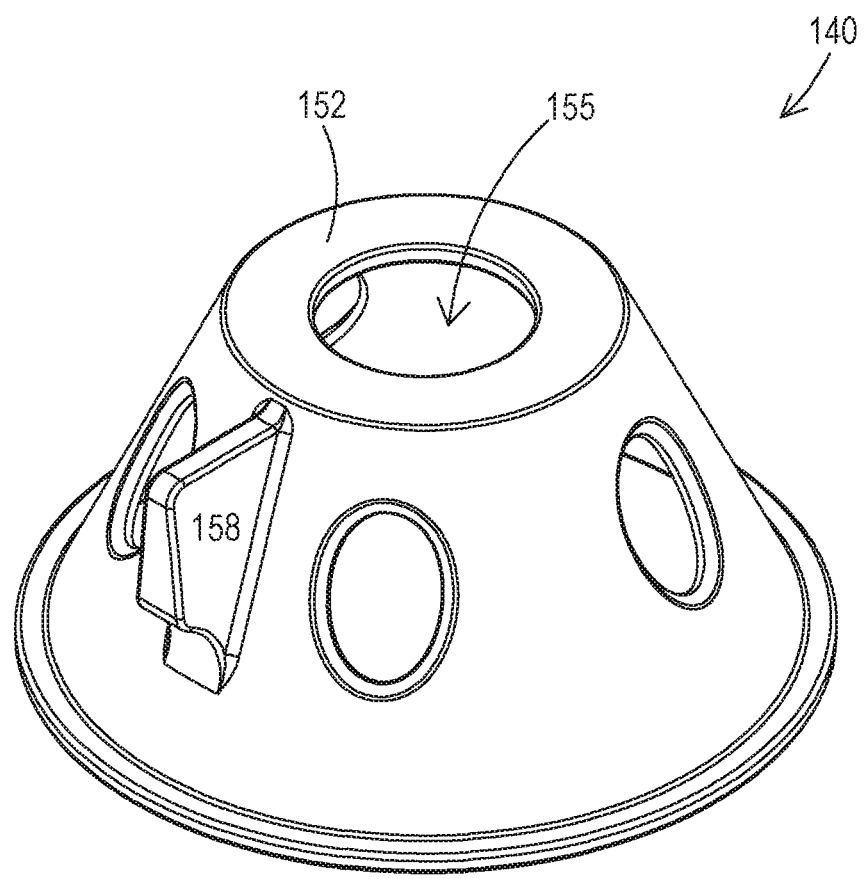
FIG. 9 is a perspective view of the rotatable exhauster vent cap.

FIG. 9 is a perspective view of the rotatable exhauster cap 140.

Figure 10:
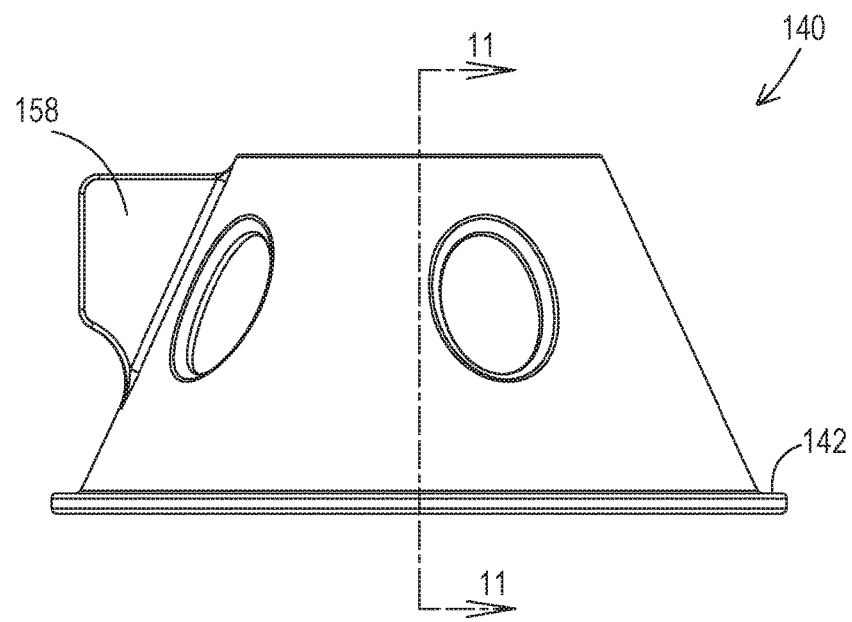
FIG. 10 is a side plan view of the rotatable exhauster vent cap.

FIG. 10 is a side plan view of the rotatable exhauster cap 140.

Figure 11:
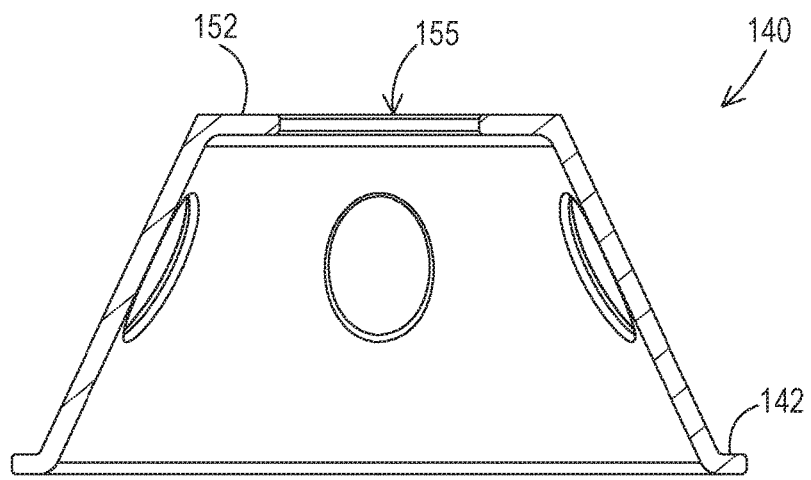
FIG. 11 is a cutaway view of the rotatable exhauster vent cap.

FIG. 11 is a cross-sectional view of the exhauster cap 140, taken along the line 11-11 of FIG. 10.

FIG. 12 is a perspective view of the retaining ring 160, according to an aspect of this disclosure. A downwardly depending diametrically extending anti-rotation tab 167 is provided on a lower surface of the retaining ring, for engaging with a corresponding anti-rotation groove 133 on the exhauster base and discouraging rotation of the retaining ring as a result of friction when the rotatable exhauster vent cap 140 is rotated for adjustment.

FIG. 13 is a top plan view of the retaining ring 160. Portions of the anti-rotation tab 167 and a circumferential anti-rotation tab 169 are visible.

FIG. 14 is a side elevational view of the retaining ring 160. Anti-rotation tab 167 and circumferential anti-rotation tab 169, both downwardly extending, are visible. When the retaining ring is positioned to hold the rotatable exhauster vent cap 140 in place relative to the exhauster base 110, the tabs 167, 169 are engaged with corresponding grooves or slots 133, 135 and discourage rotational movement of the retaining ring 160.

From the foregoing, it will be understood and appreciated that the generally frustoconical shape of the chimney or vent topper 110, with its nested frustoconical exhauster base 110 and rotatable exhauster cap 140, provide a greater surface area for the overlapping openings on the frustoconical surfaces that would be provided with a conventional, more disk-like vent topper as shown in FIG. 2. In like manner, the oval air smoke vent openings 134, 154 can be commensurately larger, providing greater venting capacity than the openings on a disk-like vent topper. Accordingly, a vent topper 110 according to the present disclosure affords greater precision and control over the flow of air, temperature control, and smoke, than would be expected from a flatter, disk-like vent topper.

Figure 15:
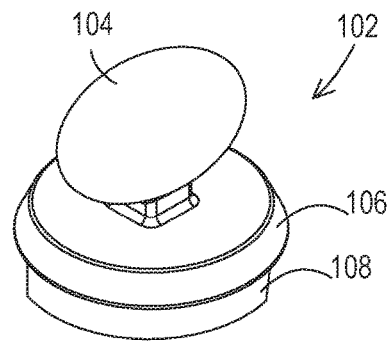
FIG. 15 is perspective view of nonventing top hole plug for a smoker vent constructed in accordance with the present disclosure.
Figure 16:
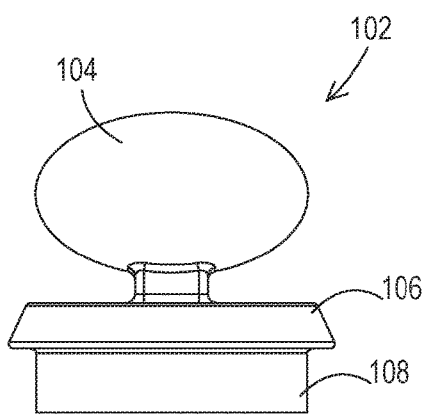
FIG. 16 is a side plan view of the nonventing top hole plug.

FIG. 15 is a perspective view of a solid plug 102 having a grippable handle 104 and a base 106. FIG. 16 is a side plan view of the solid plug 102, and shows a solid cylinder 108 that is received within the opening 125 of the exhauster chimney 123 (see FIG. 3). According to one aspect of the disclosure, without use of a decorative smoke-venting article, the cylinder 108 is positioned within the opening 125 in the exhauster base 110 and held in place with the thumbscrew 129. Using such a nonventing plug, the air and temperature and smoke control of the vent topper assembly 100 is controlled primarily by rotating the rotatable vent cap to align or partially cover the smoke-venting openings on the frustocones of the exhauster base. However, it will be understood that additional temperature control can be obtained by removing the nonventing plug, which serves to increase the air flow.

Figure 17:
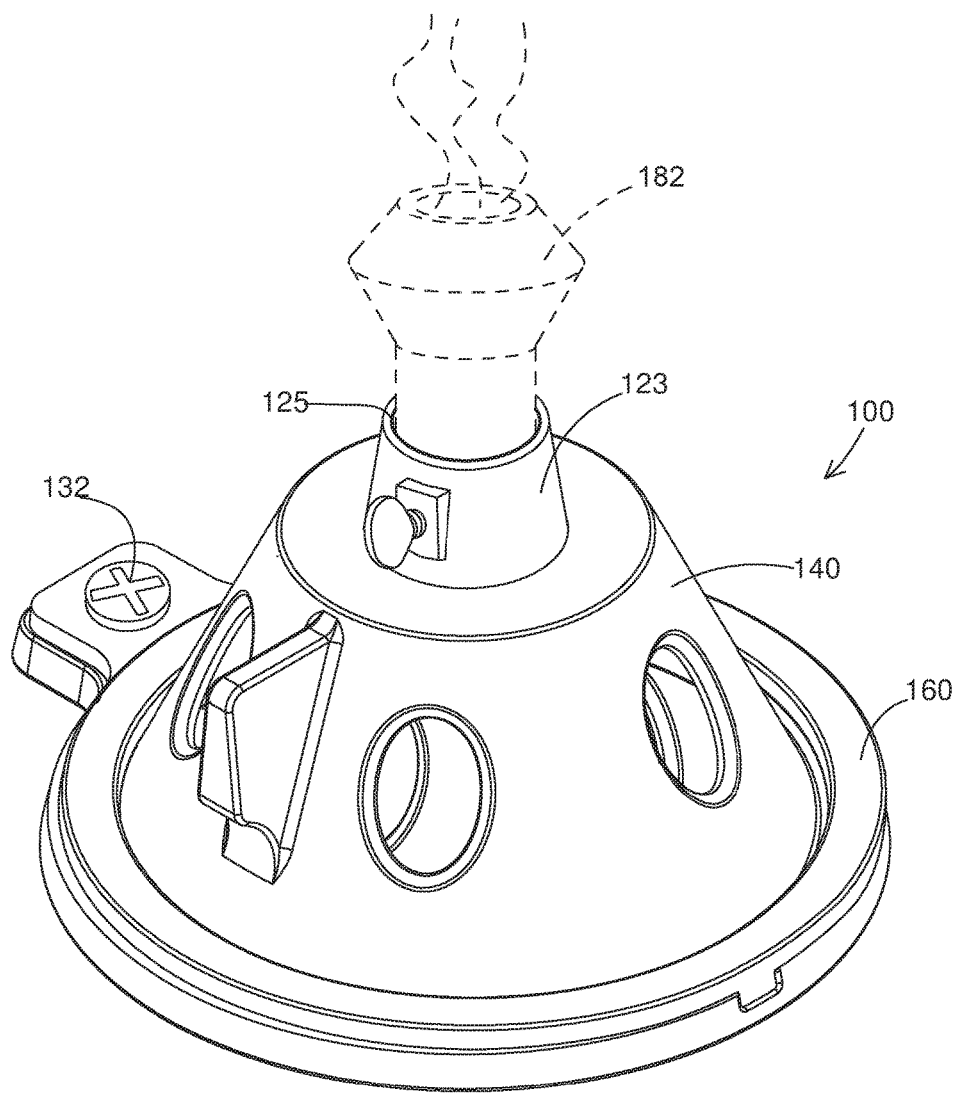
FIG. 17 is a perspective view of a decorative smoke-venting locomotive-style smokestack attachment.
Figure 18:
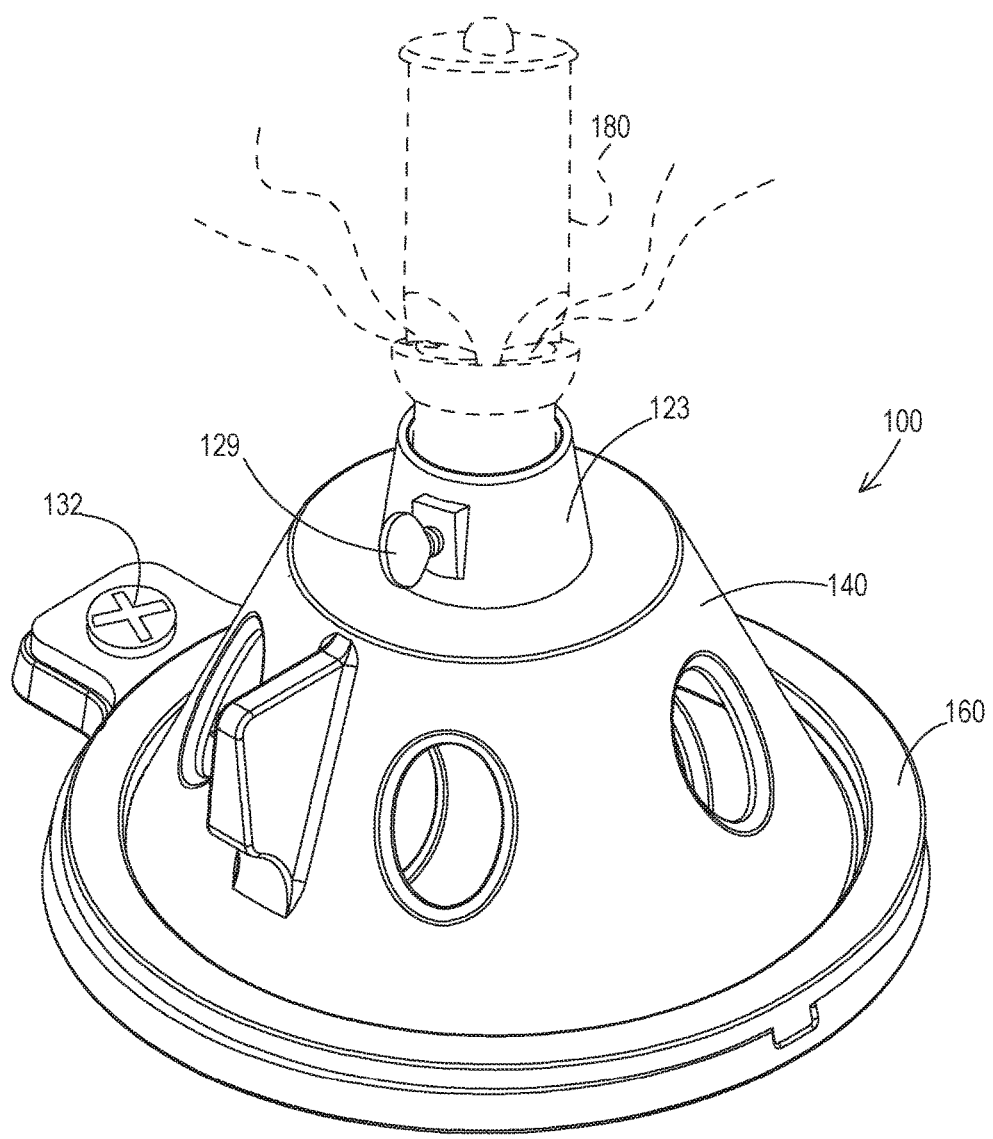
FIG. 18 is a perspective view of a decorative smoke-venting whistle-style attachment.

Turning now to FIGS. 17 and 18, exemplary decorative and entertaining smoke-exhausting accessories or articles are shown. In FIG. 17, a decorative locomotive smoke-stack-like smoke-venting article or attachment 180 (shown in phantom) is positioned within the opening 125 in the exhauster base 110, to create smoking visual entertainment. The exemplary smoke-stack 180 is a hollow tube or pipe at the bottom end and open at the top and allows smoke to come out from the smoke-stack, as if the smoke-stack were that of a locomotive. As another example, an article or attachment that looks like a small locomotive, with a smoke-stack, could be provided as another type of smoke-emitting entertainment. In such a case, the locomotive-like article would include pipe to engage with the opening 125 in the exhauster base 110.

Another exemplary decorative and entertaining smoke-exhausting accessory or article is shown in FIG. 18. In this example, a decorative whistle-like smoke-venting article or attachment 182 (shown in phantom), having a pipe to engage with the opening 125 in the exhauster base 110, may be provided to create another type of smoke-exhausting entertainment. The whistle-like article 182 is open at the sides, like a steam whistle, and allows smoke to come out from the whistle. Properly constructed, and with sufficient air flow, such a smoke-venting whistle-like attachment may even make a whistling noise.

Figure 19:
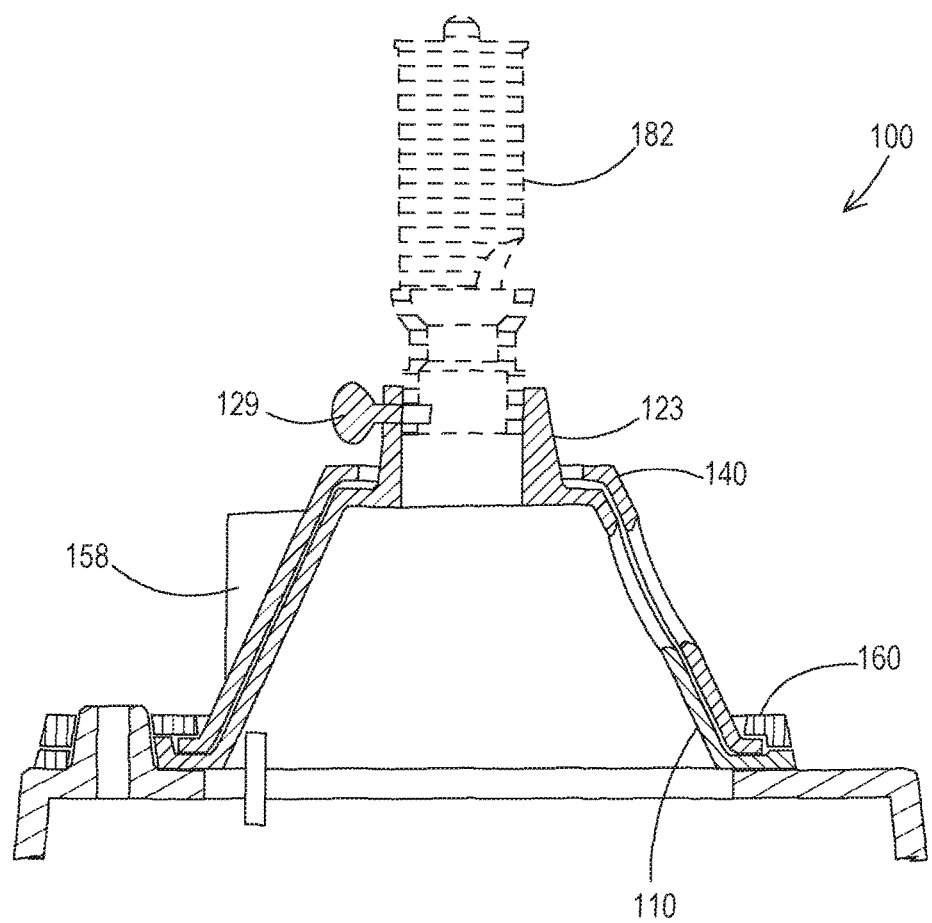
FIG. 19 is a cross-sectional view of a decorative smoke-venting whistle-style attachment positioned within a rotatable exhauster vent cap.

FIG. 19 is a cross-sectional view of the vent topper 100 of FIG. 18, showing the exemplary decorative article 182 (in phantom) in the form of a whistle positioned within the exhauster chimney 123 and fastened with a thumb screw 129.

It will be further appreciated that many different decorative and entertaining articles may be provided as smoke-emitting entertainment devices or attachments. By way of example, and not limitation, articles, e.g. in the form of replicas, having the appearance of guns, cannons, automobiles, factory smokestacks, truck exhausts, airplanes, or just about anything within the imagination from which smoke can emit in a novel and entertaining manner, may be provided.

Aspects, features, and benefits of the claimed invention(s) will become apparent from the information disclosed in this specification. Variations and modifications to the disclosed device may be effected without departing from the spirit and scope of the novel concepts of the disclosure.

It will, nevertheless, be understood that no limitation of the scope of the disclosure is intended by the information disclosed in the specification; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A cooking smoker or oven, comprising, in combination:
   a cooking oven having a vertically extending chimney for exhausting heat and smoke from a heat source within the oven;
   a vent cap base positioned on the chimney of the oven; andan adjustable smoke-venting vent topper for mounting to the vent cap base on the oven, the vent topper comprising a generally frustoconical exhauster base having alignable openings along the side of the frustocone for controlling the flow of air and smoke from within the oven, and a smoke-venting opening on the top annular surface of the frustoconical exhauster base for receiving a decorative article,
   wherein the smoke-venting opening on the top annular surface of the frustoconical exhauster base comprises an upwardly extending tubular exhauster chimney for receiving and supporting a decorative article.

2. The cooking smoker or oven of claim 1, wherein the oven is a kamado-style charcoal smoker.

3. The cooking smoker or oven of claim 1, wherein the vent topper comprises:
   a generally frustoconical exhauster base having a plurality of spaced-apart smoke-venting openings on the surface of the frustocone for allowing smoke and air to vent outwardly from the interior of the frustocone, the exhauster base being affixable to the vent cap base; and
   a generally frustoconical rotatable exhauster vent cap enclosing and housing the frustocone of the exhauster base, the exhauster vent cap having a plurality of spaced-apart smoke-venting openings on the surface of the frustocone for allowing smoke and air to vent outwardly from the interior of the exhauster base and the exhauster vent cap, the openings of the exhauster base being alignable with the openings of the exhauster vent cap for maximum air flow, the smoke-venting openings of the exhauster vent cap being movable by rotation along the axis of the frustocone of the exhauster base and the exhauster vent cap such that portions of the openings in the exhauster base may be obscured so as to reduce the surface area of the openings, to allow for selective control of air flow and smoke from within the vent topper.

4. The cooking smoker or oven of claim 3, wherein the exhauster base includes a lower annular groove and a lower annular lip at the base of the frustocone, and wherein the rotatable exhauster vent cap includes a lower annular lip at the base of the frustocone that fits within the lower annular groove of the exhauster base and is retained by the lower annular lip of the exhauster base but allowing rotational movement.

5. The cooking smoker or oven of claim 4, further comprising:
an annular retaining ring positioned over the lower annular lip of the exhauster vent cap to retain the lower annular lip of the rotatable exhauster cap within the annular groove of the exhauster base.

6. The cooking smoker or oven of claim 3, wherein the opening on the top annular surface of the frustoconical exhauster base comprises:
a smoke-venting opening on the top annular surface of the frustocone of the rotatable exhauster cap; and
a smoke-venting opening on the top annular surface of the frustocone of the exhauster base, aligned with the smoke-venting opening on the top annular surface of the rotatable exhauster cap, for receiving a decorative article.

7. The cooking smoker or oven of claim 1, wherein the frustoconical exhauster base comprises a frustoconical inner exhauster base and a nested frustoconical outer rotatable outer vent cap, having openings on the surfaces of the frustoconical inner exhauster base and the frustoconical outer rotatable vent cap that can be aligned or obscured to control the flow of air and smoke by rotating the outer rotatable outer vent cap relative to the inner exhauster base.

8. The cooking smoker or oven of claim 1, wherein the exhauster base comprises a fastening tab extending diametrically outwardly from the exhauster base and having an fastener opening therein for receiving a fastener to affix the exhauster base to the vent cap base.

9. The cooking smoker or oven of claim 8, wherein the fastening tab includes at least one anti-rotation groove for receiving at least one anti-rotation tab on a retaining ring.

10. The cooking smoker or oven of claim 9, wherein the retaining ring includes a downwardly-extending anti-rotation tab that fits within the anti-rotation groove of the fastening tab of the exhauster base.

11. The cooking smoker or oven of claim 1, further comprising an adjustment tab for allowing operator rotation of the vent topper to adjust the alignment of the smoke venting openings.

12. The cooking smoker or oven of claim 1, wherein the opening on the top annular surface of the frustoconical body is closed with a nonventing decorative plug.

13. The cooking smoker or oven of claim 1, further comprising a smoke-venting decorative article mounted to the opening on the top annular surface of the frustoconical body.

14. The cooking smoker or oven of claim 13, wherein the smoke-venting decorative article has the shape of a smoke-emitting object such as, by way of example, a locomotive smokestack, a factory smokestack, a whistle, an vehicle exhaust, a gun, a cannon.

15. A cooking smoker or oven, comprising, in combination:
a cooking oven having a vertically extending chimney for exhausting heat and smoke from a heat source within the oven;
a vent cap base positioned on the chimney of the oven; and
an adjustable smoke-venting vent topper for mounting to the vent cap base on the oven, the vent topper comprising a generally frustoconical exhauster base having alignable openings along the side of the frustocone for controlling the flow of air and smoke from within the oven, and a smoke-venting opening on the top annular surface of the frustoconical body for receiving a decorative article,
wherein the exhauster base includes a lower annular groove and a lower annular lip at the base of the frustocone, and wherein the rotatable exhauster vent cap includes a lower annular lip at the base of the frustocone that fits within the lower annular groove of the exhauster base and is retained by the lower annular lip of the exhauster base but allowing rotational movement, and
further comprising an annular retaining ring positioned over the lower annular lip of the exhauster vent cap to retain the lower annular lip of the rotatable exhauster cap within the annular groove of the exhauster base.

16. The cooking smoker or oven of claim 15, wherein the opening on the top annular surface of the frustoconical exhauster base comprises:
a smoke-venting opening on the top annular surface of the frustocone of the rotatable exhauster cap; and
a smoke-venting opening on the top annular surface of the frustocone of the exhauster base, aligned with the smoke-venting opening on the top annular surface of the rotatable exhauster cap, for receiving a decorative article.

17. The cooking smoker or oven of claim 15, further comprising a smoke-venting decorative article mounted to the opening on the top annular surface of the frustoconical body.

18. The cooking smoker or oven of claim 17, wherein the smoke-venting decorative article has the shape of a smoke-emitting object such as, by way of example, a locomotive smokestack, a factory smokestack, a whistle, an vehicle exhaust, a gun, a cannon.

19. An adjustable smoke-venting vent topper for mounting to a vent cap base for the chimney of a kamado-style cooking smoker or oven, comprising:
a generally frustoconical exhauster base having a lower annular groove and a lower annular lip at the base of the frustocone, the exhauster base having a plurality of spaced-apart smoke-venting openings on the surface of the frustocone for allowing smoke and air to vent outwardly from the interior of the frustocone;
the exhauster base being affixable to a vent cap base for the chimney of a kamado-style cooking smoker or oven;
a generally frustoconical rotatable exhauster vent cap having a lower annular lip at the base of the frustocone, the vent cap enclosing and housing the frustocone of the exhauster base, the exhauster vent cap having a plurality of spaced-apart smoke-venting openings on the surface of the frustocone for allowing smoke and air to vent outwardly from the interior of the exhauster base and the exhauster vent cap, the openings of the exhauster base being alignable with the openings of the exhauster vent cap for maximum air flow, the smoke-venting openings of the exhauster vent cap being movable by rotation along the axis of the frustocone of the exhauster base and the exhauster vent cap such that portions of the openings in the exhauster base may be obscured so as to reduce the surface area of the openings, to allow for selective control of air flow and smoke from within the vent topper;

the lower annular lip of the exhauster vent cap being received in the lower annular groove of the exhauster base and retained by the lower annular lip of the exhauster base but allowing rotational movement;

an annular retaining ring positioned over the lower annular lip of the exhauster vent cap to retain the lower annular lip of the rotatable exhauster cap within the annular groove of the exhauster base;

a smoke-venting opening on the top surface of the frustocone of the rotatable exhauster cap; and a smoke-venting opening on the top annular surface of the frustocone of the exhauster base, aligned with the smoke-venting opening on the top annular surface of the rotatable exhauster cap, for receiving a decorative article;

wherein the smoke-venting opening on the top annular surface of the frustocone of the exhauster base is tubular for receiving and supporting a decorative article.

20. The vent topper of claim 19, wherein the exhauster base comprises a fastening tab extending diametrically outwardly from the lower annular lip, having an fastener opening therein for receiving a fastener to affix the exhauster base to a vent cap base.

21. The vent topper of claim 20, wherein the fastening tab includes at least one anti-rotation groove for receiving at least one anti-rotation tab on the retaining ring.

22. The vent topper of claim 21, wherein the retaining ring includes a downwardly-extending anti-rotation tab that fits within the anti-rotation groove of the fastening tab of the exhauster base.

23. The vent topper of claim 19, wherein the rotatable exhauster cap includes an adjustment tab on the outer surface of the frustocone, for allowing operator rotation of the rotatable exhauster cap to adjust the alignment of the smoke venting openings of the rotatable exhauster cap relative to the exhauster base.

24. The vent topper of claim 19, wherein the smoke-venting openings on the top surfaces of the frustocones of the exhauster base and the rotatable exhauster vent cap are closed with a nonventing plug.

25. The vent topper of claim 19, further comprising a smoke-venting decorative article mounted to the smoke-venting openings on the top surfaces of the frustocone.

26. The vent topper of claim 25, wherein the smoke-venting decorative article has the shape of a smoke-emitting object such as, by way of example, a locomotive smokestack, a factory smokestack, a whistle, an vehicle exhaust, a gun, a cannon.

27. An adjustable smoke-venting vent topper for mounting to a vent cap base for the chimney of a kamado-style cooking smoker or oven, comprising:

a generally frustoconical exhauster base having a lower annular groove and a lower annular lip at the base of the frustocone, the exhauster base having a plurality of spaced-apart smoke-venting openings on the surface of the frustocone for allowing smoke and air to vent outwardly from the interior of the frustocone;

the exhauster base being affixable to a vent cap base for the chimney of a kamado-style cooking smoker or oven;

a generally frustoconical rotatable exhauster vent cap having a lower annular lip at the base of the frustocone, the vent cap enclosing and housing the frustocone of the exhauster base, the exhauster vent cap having a plurality of spaced-apart smoke-venting openings on the surface of the frustocone for allowing smoke and air to vent outwardly from the interior of the exhauster base and the exhauster vent cap, the openings of the exhauster base being alignable with the openings of the exhauster vent cap for maximum air flow, the smoke-venting openings of the exhauster vent cap being movable by rotation along the axis of the frustocone of the exhauster base and the exhauster vent cap such that portions of the openings in the exhauster base may be obscured so as to reduce the surface area of the openings, to allow for selective control of air flow and smoke from within the vent topper;

the lower annular lip of the exhauster vent cap being received in the lower annular groove of the exhauster base and retained by the lower annular lip of the exhauster base but allowing rotational movement;

an annular retaining ring positioned over the lower annular lip of the exhauster vent cap to retain the lower annular lip of the rotatable exhauster cap within the annular groove of the exhauster base;

a smoke-venting opening on the top surface of the frustocone of the rotatable exhauster cap; and a smoke-venting opening on the top surface of the frustocone of the exhauster base, aligned with the smoke-venting opening on the top annular surface of the rotatable exhauster cap, for receiving a decorative article, wherein the exhauster base comprises a fastening tab extending diametrically outwardly from the lower annular lip, having an fastener opening therein for receiving a fastener to affix the exhauster base to a vent cap base, wherein the fastening tab includes at least one anti-rotation groove for receiving at least one anti-rotation tab on the retaining ring.

28. The vent topper of claim 27, further comprising a smoke-venting decorative article mounted to the smoke-venting openings on the top surfaces of the frustocone.

29. The vent topper of claim 28, wherein the smoke-venting decorative article has the shape of a smoke-emitting object such as, by way of example, a locomotive smokestack, a factory smokestack, a whistle, an vehicle exhaust, a gun, a cannon.

* * * * *